United States Patent
Reilly et al.

(10) Patent No.: US 6,613,213 B1
(45) Date of Patent: Sep. 2, 2003

(54) METHOD FOR PRODUCING ELECTRODES USING MICROSCALE OR NANOSCALE MATERIALS OBTAINED FROM HYDROGENDRIVEN METALLURGICAL REACTIONS

(75) Inventors: James J. Reilly, Bellport; Gordana D. Adzic, Setauket; John R. Johnson, Calverton; Thomas Vogt, Cold Spring Harbor; James McBreen, Bellport, all of NY (US)

(73) Assignee: Brookhaven Science Associates, LLC, Upton, NY (US)

(*) Notice: Subject to any disclaimer, the term of this patent is extended or adjusted under 35 U.S.C. 154(b) by 0 days.

(21) Appl. No.: 09/535,729

(22) Filed: Mar. 27, 2000

(51) Int. Cl.⁷ .................................................. H01M 4/04
(52) U.S. Cl. ......................... 205/59; 205/704; 29/623.1
(58) Field of Search .................... 205/59, 704; 29/623.1

(56) References Cited

U.S. PATENT DOCUMENTS

| | | |
|---|---|---|
| 4,112,199 A | 9/1978 | Dunlop et al. |
| 5,389,333 A | 2/1995 | Li et al. |
| 5,401,578 A | 3/1995 | Motohiro et al. |
| 5,474,623 A | 12/1995 | Ma et al. |
| 5,571,612 A | 11/1996 | Motohiro et al. |
| 5,580,396 A | 12/1996 | Fruchart et al. |
| 5,656,388 A | 8/1997 | Bugga et al. |
| 5,716,709 A | 2/1998 | Ferguson et al. |
| 5,720,828 A | 2/1998 | Strom-Olsen et al. |
| 5,824,285 A | 10/1998 | Koksbang |
| 5,851,312 A | 12/1998 | Honkura et al. |
| 5,872,074 A | 2/1999 | Schulz et al. |
| 5,888,665 A | 3/1999 | Bugga et al. |
| 5,908,715 A | 6/1999 | Liu et al. |
| 5,952,125 A | 9/1999 | Bi et al. |
| 5,955,220 A | 9/1999 | Takada et al. |
| 5,976,271 A | 11/1999 | Nomura et al. |

FOREIGN PATENT DOCUMENTS

GB      1 554 384      4/1977

OTHER PUBLICATIONS

J. Block, et al., "The Thermal Decomposition of Lithium Aluminum Hydride", *Inorg. Chem.*, 4:304–305 (1965), No month.

J. J. Reilly, et al., "The Reaction of Hydrogen with Alloys of Magnesium and Copper", *Inorg. Chem.*, 6:2220–2223 (1967), No month.

S. Aronson, et al., "The Solid–State Reaction of Lithium Hydride and Aluminum," *Inorg. Chem.*, 8:1541–1542 (1969), No month.

E. Veleckis, "Application of the Hydrogen Titration Method to a Thermodynamic Investigation of Solid A1–Ca Alloys," *Journal of the Less–Common Metals*, 80:241–255 (1981), No month.

(List continued on next page.)

*Primary Examiner*—Arun S. Phasge
(74) *Attorney, Agent, or Firm*—Margaret C. Bogosian

(57) ABSTRACT

A method is provided for producing electrodes using microscale and nanoscale metal materials formed from hydrogen driven metallurgical processes; such a the HD (hydriding, dehydriding) process, the HDDR (hydriding, dehydriding, disproportionation, and recombination) process, and variants thereof.

48 Claims, 2 Drawing Sheets

OTHER PUBLICATIONS

Ruiz de Angulo, et al., "Powder Metallurgical Processing of $Tb_{0.27}D_{0.73}Fe_{2-x}$ ($0.5 \geq x \geq 0.1$) from Fine Hydride Powder," *Zeitschrift für Physikalische Chemie, Bd.*, 183:1479–1487 (1994), No month.

T. Takeshita, "Some Applications of Hydrogenation–Decomposition–Desorption–Recomination (HDDR) and Hydrogen–Decrepitation (HD) in Metals Processing," *Journal of Alloys and Compounds*, 231: 51–59 (1995), No month.

M. Okada et al., "Microstructural Evolution During HDDR Phenomena in $Sm_2 Fe_{17} N_x$ Compounds," *Journal of Alloys and Compounds*, 231: 60–65 (1995), No month.

Idota et al., "Tin–Based Amorphous Oxide: A High–Capacity Lithium–Ion–Storage Material," *Science*, 276: 1395–1397 (1997), No month.

I. A. Courtney, et al., "Electrochemical and In Situ X–Ray Diffraction Studies of the Reaction of Lithium with Tin Oxide Composites," *J. Electrochem. Soc.*, 144(6):2045–2052 (1997), No month.

P. G. Bruce, "Solid State Chemistry of Lithium Power Sources," *Royal Soc. Chem.Comm*; 1817 (1997), No month.

Gao et al., "Effects of Reduced Hydrogen Pressure on Magnetic Properties of HDDR–treated NdFeGaB Aloy Powders," *Journal of Alloys and Compounds*, vol. 267, Issue 1–2, Mar. 6, (1998) (Abstract), No month.

Itakura et al., "TEM Study of Microstructural Changes in an Anisotropic Nd–Fe–Co–B–Zr Magnet Alloy during HDDR Process," *Materials Transactions*, JIM, vol. 39, No. 1, pp. 95–101 (1998) (Abstract), No month.

Kubis et al., "Influence of M=Al, Ga and Si on Microstructure and HDDR–processing of $Sm_2 (Fe,M)_{17}$ and Magnetic Properties of their Nitrides and Carbides," *Journal of Alloys and Compounds* 283: 296–303 (1999), No month.

O. Mao, et al., "Active/Inactive Nanocomposites as Anodes for Li–Ion Batteries," *Electrochemical and Solid–State Letters*, 2(1) 3–5 (1999), No month.

M. Matsuura, Abstract on evolution of magnetic anisotropy of $Nd_2Fe_{14}B$ in the HDDR process, (No date).

Kepler, et al., "$Li_xCu_6Sn_5$ (0<x<13): An Intermetallic Insertion Electrode for Rechargeable Lithium Batteries," *Electrochemical and Solid–State Letters*, 2(7)307–309 (1999), No month.

METHOD FOR PRODUCING ELECTRODES USING MICROSCALE OR NANOSCALE MATERIALS OBTAINED FROM HYDROGENDRIVEN METALLURGICAL REACTIONS

This invention was made with Government support under Contract No. DE-AC02-98CH10886 between the U.S. Department of Energy and Brookhaven Science Association. The Government has certain rights in the invention.

BACKGROUND OF INVENTION

The invention relates to a method for producing an electrode. More specifically, the invention relates to a method for producing an electrode using microscale or nanoscale materials obtained from hydrogen driven metallurgical reactions.

The miniaturization of electronic components has created widespread growth in the use of portable electronic devices such as cellular phones, pagers, video cameras, facsimile machines, portable stereophonic equipment, personal organizers and personal computers. The growing use of portable electronic equipment has created ever increasing demand for improved power sources that are safe, long-lasting, and are high energy density rechargeable batteries.

There is also an ongoing investigation into the manufacture of batteries suitable for use in electric motor vehicles or hybrid motor vehicles that can operate on electric and combustion power.

A battery or voltaic cell generally includes two chemicals or elements with differing electron-attracting capabilities that are immersed in an electrolytic solution and connected to one another through an external circuit. These two chemicals can be referred to as an electrochemical couple. The reaction that occurs between an electrochemical couple and a voltaic cell is a reduction-oxidization (redox) reaction.

The mechanism by which a battery generates an electric current typically involves the arrangement of chemicals in such a manner that electrons are released from one part of the battery via said redox reaction and made to flow through an external circuit or cell connection to another part of the battery. The element of the battery at which the electrons are released to the circuit is called the anode. During discharge, oxidation reactions occur at the anode. The element that receives the electrons from the circuit is known as the cathode, or the positive electrode. During discharge, reduction reactions occur at the cathode.

At rest, a voltaic cell exhibits a potential difference (voltage) between its two electrodes that is determined by the maximum amount of chemical energy available when an electron is transferred from one electrode to the other. The current that flows from the cell is determined by the resistance of the total circuit, including that of the cell itself. Further, a voltaic cell has a limited energy content, or capacity, that is generally given in ampere-hours and determined by the quantity of electrons that can be released at the anode and accepted at the cathode. When all of the chemical energy of the cell has been consumed (usually because the anode has been completely discharged) the operating voltage falls to zero and will not recover unless the battery can be recharged. The capacity of the cell is determined by the quantity of active ingredients in the electrode.

Presently, the most widely used rechargeable batteries are secondary batteries employing aqueous electrolytes, such as nickel/cadmium and nickel metal-hydride batteries. The half-cell reactions taking place in a nickel/metal-hydride cell may be written as follows:

Anode

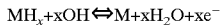

$$MH_x + xOH^- \Leftrightarrow M + xH_2O + xe^- \quad [1]$$

Cathode

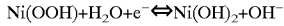

$$Ni(OOH) + H_2O + e^- \Leftrightarrow Ni(OH)_2 + OH^- \quad [2]$$

It is in effect a rocking chair type electrochemical cell in which hydrogen is transferred from one electrode to the other.

Nickel/metal-hydride cells have similar operating characteristics to nickel/cadmium cells, but the nickel/metal-hydride cells use a metal-hydride anode in place of cadmium.

At the anode of the nickel/metal-hydride cell, a reversible electrode oxidation reaction occurs with OH⁻ ions at the surface of the electrode. When the battery is charged, a corresponding reduction reaction occurs at the surface of the electrode in which hydrogen is absorbed into the metal producing a solid metal hydride and a hydroxide ion. The metal expands when absorbing the hydrogen and shrinks when releasing the hydrogen. The increase in volume during the hydriding reaction is a consequence of the volume of the absorbed hydrogen atoms.

The atomic volume of hydrogen in a metal, $V_H$, is defined as the increase in the volume of the unit cell of the metal upon the insertion of one hydrogen atom. The expansion of the metal due to the absorption of hydrogen has been directly correlated to electrode corrosion. See Willems J. J. G. and Buschow K. H. J., *J. Less-Common Metals,* 129:13(1987).

There is also a corresponding contraction when hydrogen is removed. The anode is therefore subjected to volumetrically induced strains during charging and discharging cycles. This imposes great mechanical stress on the alloy which, consequently, breaks down into small particles. Furthermore, a large volume change in each charge and discharge cycle increases the flushing action of the electrolyte through the pores and micro-cracks of the electrode, thereby increasing the corrosion rate.

Lithium batteries have also been investigated vigorously as a battery that can ensure a high-energy density. Lithium batteries are prepared from one or more lithium electrochemical cells. Such cells typically include an anode of metallic lithium, a cathode, typically $LiMeO_2$ (Me=Co, Ni or Mn), and an electrolyte interposed between separated positive and negative electrodes. The electrolyte typically comprises a salt of lithium dissolved in one or more solvents, typically non-aqueous (aprotic) organic solvents.

By convention, the lithium electrode of the cell is defined as the anode and the counter electrode is referred to as the cathode. During use of the cell, lithium ions (Li⁺) are transferred to the "anode" on charging (in reality the Li electrode is acting as a cathode in the charging step). During discharge, lithium ions (Li⁺) are transferred from the Li (anode) to the now positive electrode (cathode). Upon subsequent charge and discharge, the lithium ions are transported between the electrodes. Cells having metallic lithium anode and complex metal oxide cathode are assembled in the charged state.

During discharge, lithium ions from the metallic anode are transported through the liquid electrolyte to the cathode. During charging, the flow of lithium ions is reversed and they are transferred from the "cathode" material through the electrolyte to the lithium "anode".

However, Li metal anodes have a serious disadvantage as they undergo undesirable morphological changes which not only affect cell performance, but can also constitute a severe safety hazard. The substitution of lithium alloys for metallic Li does not improve the situation as they are subject to severe strain due to the charging and discharging process. This is due to the large volume changes the bulk alloy undergoes when Li is inserted or removed. For example, in the case of tin, the expansion can be as high as 300% upon Li insertion. See K. D. Kepler et al. *Electrochemical and Solid State Letters,* 2(7): 307 (1999). Of course, there is a corresponding contraction upon the discharge of Li from the alloy. The stress incurred in charge and discharge of Li rapidly fractures the alloy into smaller particles. As this occurs the particles lose contact with one another and become electrically isolated and inactive. This is believed to be the source of the poor reversibility of such electrodes, which is reflected by rapid capacity decay.

Therefore, there is a need for electrochemical cells, such as lithium, nickel/metal hydride, etc., with electrodes that can better withstand such volumetrically induced strains.

In an effort to avoid the problems associated with metal anodes, the Sony Corporation introduced a lithium ion battery in approximately 1991 where the lithium metal anode was replaced by an anode made of a carbonaceous material. In this battery, lithium metal need not be present at any time. Lithium ions are transported back and forth between a cathode and a carbon intercalation anode. While cycle life and safety was considerably improved relative to Li metal anodes, a substantial penalty was incurred in battery capacity. Further, the battery must be fabricated with a cathode containing a large excess of Li, since it must provide enough Li in the first charge cycle to form the Li/C intercalation compound which is the active anode material. See P. G. Bruce, *Royal Society, Chemical Communications,* 1897 (1997). In addition, some Li is irreversibly absorbed by the carbon. These are considerable disadvantages, since the battery must undergo long, tedious and expensive operations at the factory before it can be used.

Recently, a new approach to the use of non-carbon anodes was described by Idota et al., *Science,* 276:1395 (1997), involving a composite oxide glass containing SnO. Initially it was thought that Li was inserted into the oxide in a mechanism similar to the Li—C intercalation process. However, Dahn et al., *J. Electrochem. Soc.,* 144:2045 (1997) have shown that the initial reaction upon Li insertion is the formation of $Li_2O$ and metallic Sn. After the complete reduction of Sn, the introduction of additional Li can form a series of $Li_xSn$ phases where x may vary from 1.71 to 4.4. These $Li_xSn$ phases form extremely small grains (<100 nm) embedded in an oxide matrix. In subsequent cycles, the Li/Sn alloy grains react reversibly with respect to Li removal and insertion. The presence of the inert oxide matrix apparently helps to physically stabilize the electrode upon cycling. The presence of the small, active, alloy grains in an inactive matrix helps to solve important problems with respect to the insertion of Li into bulk alloys, i.e., its large partial molar volume and sluggish reaction kinetics. Mao et al., *Electrochemical and Solid State Ltrs.,* 2:3 (1999) refer to this class of Li anode materials as nanocomposites.

However, a serious problem with the in situ preparation of Li/Sn alloys is the large amount of Li converted to $Li_2O$ in the first charge cycle due to the reduction of tin oxide to tin by Li. This means that the battery must be assembled with the cathode containing enough excess Li to reduce SnO in the anode as well as supplying the disadvantage will be incurred where any Li alloy anode is prepared via the in situ reduction of a metal oxide.

While it is possible to produce Li alloys ex situ as finely divided particles by mechanical attrition or ball milling; such methods have several disadvantages. Water and oxygen contamination must be rigidly excluded from the process. Therefore, the process is carried out under an inert atmosphere. Mechanical milling can also introduce impurities into the alloy particles from the equipment used in physically reducing the particle size. The mechanical equipment involved tends to cumbersome to operate and maintain. Mechanical milling also creates plastic deformation of the alloy particles, which can undesirably alter the their metallurgical properties. Finally, such mechanical processes are not very reproducible.

Therefore, there is also a need for an electrode which avoids the problem of Li being converted to $Li_2O$ in the first charge cycle. Further, it is also desirable to start with an anode where the reversible $Li_xSn$ phase is incorporated in the anode before battery assembly as this would reduce, or even eliminate, the need for the cathode to contain Li upon battery assembly.

SUMMARY OF INVENTION

In accordance with the present invention, a method is provided for producing an electrode. A metal is subjected to a hydrogen driven process in order to reduce the particle size of the metal. Preferred hydrogen driven processes are the hydriding-dehydriding (HD) process, hydriding-dehydriding-disproportionation-recombination (HDDR) process, and variations thereof including the DDR and DR processes. The hydrogen driven processes are used to provide various microscale or nanoscale materials, which can then be formed into an electrode by conventional means.

When utilizing the HD method, a metal capable of forming a reversible metal hydride is hydrided sufficient to at least partially convert the metal to a metal hydride. The metal hydride is then dehydrided sufficient to re-form the original metal. These steps are alternately repeated sufficient to physically reduce the metal to a microscale material. The metal is not changed chemically, but the size of its particles are reduced. The microscale metallic particles can them be formed into an electrode by conventional means.

When utilizing the conventional HDDR method, a metal alloy having at least one component capable of forming a stable metal hydride is hydrided to form a reversible metal hydride. The reversible metal hydride is then dehydrided. The metal alloy is then hydrided and dehydrided, alternately, to produce a microscale metal alloy. The microscale metal alloy is disproportionated at an elevated temperature to form a stable metal hydride and metal component. The stable metal hydride is dehydrided and, subsequently, the metal from the dehydrided stable metal hydride is recombined with the metal component to re-form the microscale metal alloy. The disproportionation and dehydriding/recombining steps are repeated, alternately, sufficient to physically reduce the microscale metal alloy to a nanoscale metal alloy powder. The metal alloy powder is then formed into an electrode by any conventional means.

In another embodiment, a metal component can be additionally present when dehydriding the metal alloy in the first step of the HDDR process. The presence of such a metal can result in the formation of a new alloy during the subsequent DR step, which can then undergo cyclic disproportionation-recombination reactions to reduce the alloy to the desired particle size.

In another embodiment, a metal oxide is additionally present when initially hydriding the metal alloy to form a reversible metal alloy hydride. Preferred metal oxide components are SnO or $SiO_2$. The presence of a metal oxide produces a nanocomposite material, which can then be formed into an electrode. A metal fluoride, such as $SnF_2$, can similarly be present instead of a metal oxide when initially hydriding the metal alloy so as to yield a nanocomposite material.

In a preferred embodiment of the invention, a DDR (dehydriding, disproportionation, recombination) process is used with a complex metal alloy hydride as the starting material. The complex metal alloy hydride having at least one component capable of forming a stable metal hydride is irreversibly dehydrided to form a partially dehydrided complex metal alloy hydride. The partially dehydrided complex metal alloy hydride is then irreversibly disproportionated into a stable metal hydride and metal component. The stable metal hydride is reversibly dehydrided. Subsequently, the metal from the dehydrided stable metal hydride is recombined with the metal component to form a microscale metal alloy. The microscale metal alloy is then disproportionated and reversibly dehydrided/recombined, alternately, sufficient to physically reduce the microscale metal alloy to a metal alloy powder. The metal alloy powder is then formed into an electrode by any known means.

Preferred complex metal alloy hydrides are those having a Group 1 or 2 metal, Al or B, and hydrogen. $LiAlH_4$ is most preferred. When irreversibly dehydriding the complex metal alloy hydride in the first step of the DDR process, a metal component, carbon, or combination thereof can be additionally present. Also, it is preferred that the starting materials, such as the complex metal alloy hydride and any additional materials initially present, be in granular form when irreversibly dehydriding the complex metal alloy hydride in the first step of the process.

A metal oxide component can also be present when irreversibly dehydriding the complex metal alloy hydride. The presence of the metal oxide component initially in the process yields a nanocomposite material product, which is formed into an electrode. Preferred metal oxide components are SnO, $SnO_2$, $SiO_2$, a transition metal oxide, MgO, CaO, $Al_2O_3$, any metal oxide capable of being reduced by lithium, or a combination thereof. $SiO_2$ is preferred. Similarly, a metal fluoride component, such as $SnF_2$, can be additionally present instead of a metal oxide component when irreversibly dehydriding the complex metal alloy hydride in the first step of the process. The initial presence of a metal fluoride component produces a nanocomposite material, which is then formed into an electrode.

In another embodiment of the invention, a metal alloy is subjected to a DR process (disproportionation and recombination) to yield a metal alloy powder. The metal alloy is reversibly disproportionated to form a stable metal hydride and metal component. The stable metal hydride is dehydrided and, subsequently, the metal from the dehydrided metal hydride is recombined with the metal component to form a microscale metal alloy. The microscale metal alloy is then alternately disproportionated and the resulting stable metal hydride is dehydrided sufficient to reduce the microscale metal alloy into a metal alloy powder.

A preferred metal alloy for the DR process is $Li_xSn$, wherein x ranges between 0.57 and 4.4. A metal component can be additionally present when disproportionating the metal alloy in the first step. Since the HD steps are bypassed, it is preferred that the starting materials already be in granular form. A metal oxide component, such as SnO, can be initially present when reversibly disproportionating the metal alloy so as to yield a nanocomposite material. A metal fluoride can be initially present instead of a metal oxide in order to form a nanocomposite material.

In another embodiment of the invention, a stable binary metal hydride is dehydrided in the presence of an additional metal component to directly yield a metal alloy powder. The metal alloy powder is then formed into an electrode. LiH is a preferred binary hydride. Aluminum is a preferred metal component. In a preferred embodiment, the stable binary metal hydride is dehydrided in the presence of a metal oxide component to directly yield a nanocomposite material. Again, LiH is a preferred binary metal hydride. SnO is a preferred metal oxide component. The processes may not directly yield the desired alloy particle size. Thus, in both processes described above using a stable binary metal hydride as a starting material, it may be necessary to alternately disproportionate the resulting microscale metal alloy and dehydride the resulting metal hydride sufficient to physically reduce the microscale metal alloy to a nanoscale material.

In another embodiment, in the processes which yield a metal alloy powder, instead of forming the metal alloy powder into an electrode, the metal alloy powder formed by the hydrogen driven process can be partially oxidized to form a nanocomposite material. The nanocomposite material can then be formed into an electrode by known means.

In another embodiment, after the electrode is formed by the processes discussed above, lithium can be electrochemically introduced into the electrode if desired so as to yield an electrochemically reversible lithium alloy within the electrode.

The method of the invention avoids the disadvantages associated with known processes such as mechanical attrition or ball milling. The method of the invention provides further advantages due to the great flexibility of materials with which the method can be used. An almost inexhaustible number of alloys and materials can be treated, and alloy microstructures can be varied as a function of process parameters. The process can be precisely controlled and reproduced.

Because the process of the invention provides electrodes which include finely divided materials, fracture during charging and discharging cycles is reduced as the smaller particle size increases its capability of accommodating the strain of inserted lithium. Also, alloys with smaller grain size not only rely on the bulk metal grain to store Li, but also on the large surface area occurring at the grain boundaries. Thus, volumetrically induced strains are substantially reduced in the grain interior, again decreasing the tendency for particle fracture.

Also, the method of the invention for producing an electrode avoids the large amount of Li converted to $Li_2O$ in the first charge cycle because the metal oxide can be reduced ex situ. Additionally, the active Li alloy grains in the electrode are produced ex situ which significantly reduces the initial lithium content of the cathode in the assembled battery.

DETAILED DESCRIPTION OF THE INVENTION

Figure 1:
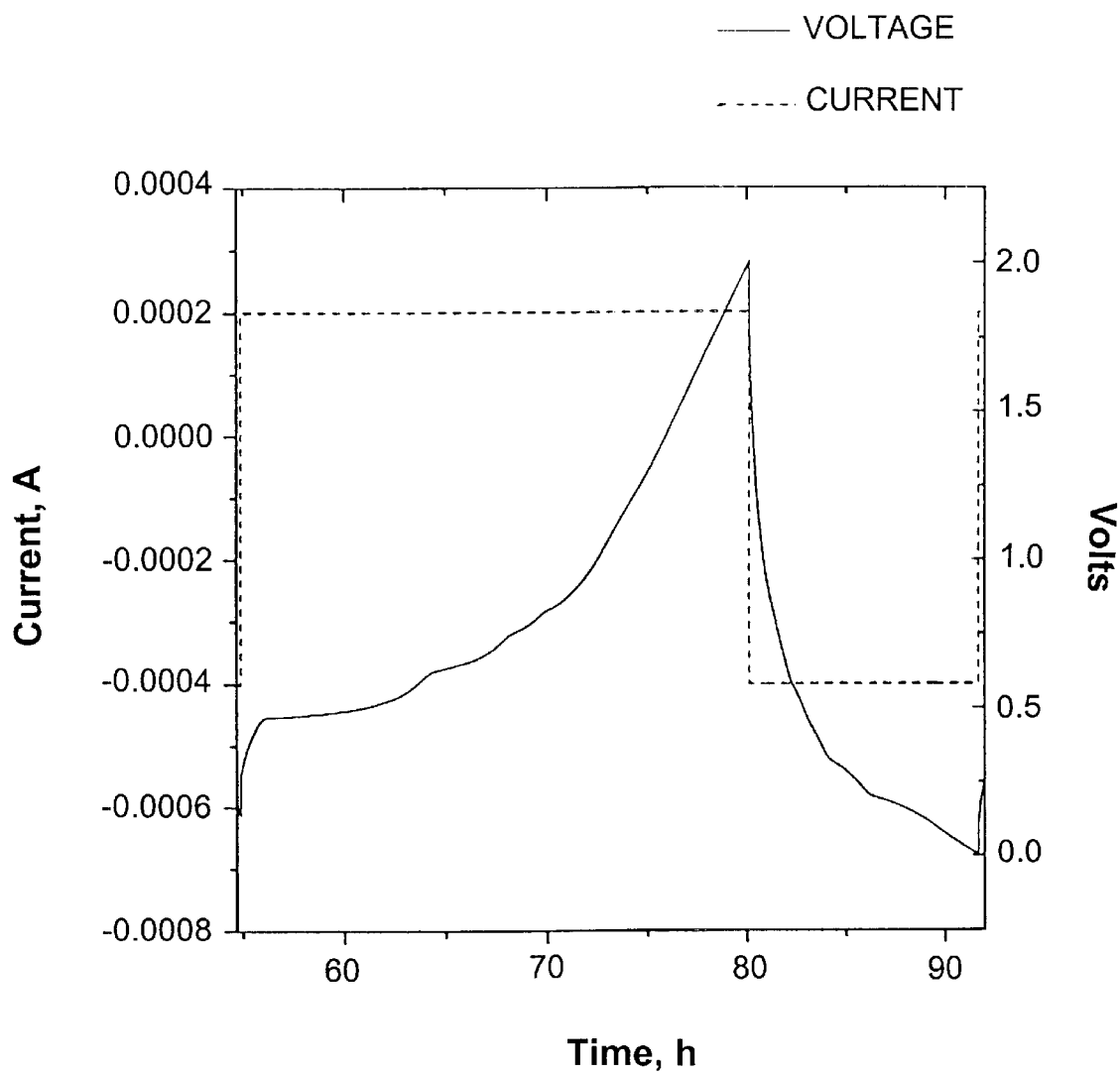
FIG. 1 is a graph illustrating the voltage and current of an electrode produced by a method of the invention containing $Li_5Sn_2$, $Li_7Sn_2$, $Li_{13}Sn_5$, Al and $Li_2O$ as determined by X-ray analysis during a single charge-discharge cycle.

It has been found that electrodes can be produced using microscale or nanoscale materials obtained from hydrogen driven metallurgical processes. The process of the invention provides electrodes with superior electrochemical properties.

"Hydrogen driven reactions" are defined herein as any metallurgical reaction which utilizes the addition and removal of hydrogen from a metal to physically break down the metal into smaller particles. There are many possible hydrogen driven reactions that can produce a variety of finely divided materials. These hydrogen driven reactions fall into two general categories. The first is the HD (hydriding, dehydriding) process, and variations thereof. The second is the HDDR (hydriding, dehydriding, disproportionation, and recombination) process and variations thereof, such as DDR and DR.

The direct reaction of hydrogen with a metal to form a metal hydride phase results in a large volume change which, with few exceptions, results in pulverization of the material. The nature of the product formed by this process depends upon the nature of the fracture processes. There are a number of experimental variables which include the following: hydrogen pressure, pressure cycling, temperature cycling, initial particle size, and alloy composition.

The HD Process

The effects of the cyclic absorption and desorption of hydrogen upon alloy structural and metallurgical characteristics have been exploited to produce rare earth alloy powders for fabrication of magnets, for example $Nd_2Fe_{14}B$. This process has been described in U.K. Patent No. 1 554 384, which is incorporated herein by reference in its entirety. The process has been described as the HD (Hydriding, Dehydriding) process.

More generally, the HD process may be applied to any elemental metal or metal alloy that reversibly forms a metal hydride phase, although it has primarily found application with metal alloys. Hydrogen storage alloys such as TiFe and $LaNi_5$ are examples where the HD process operates to produce alloy powders suitable for energy storage applications.

The term "metal" as used herein includes both elemental metals and metal alloys, unless specified otherwise. "Hydriding" means adding hydrogen to a metal. "Dehydriding" is the removal of hydrogen.

The reversible HD process includes the steps of subjecting the metal to a hydrogen-containing atmosphere, at such temperature and pressure that the metal is converted to a metal hydride. The temperature usually ranges between 25 and 350° C. However, it should always be below the temperature where metal atom mobility of the metal components becomes significant. Otherwise, the alloy is subject to disproportionation which in certain applications is not desirable. The pressure usually ranges from about 0.8 to about 100 atm.

The metal hydride is then subjected to conditions of temperature and pressure such that hydrogen is released and the metal is dehydrided. At a given temperature, an equilibrium pressure is reached. The direction of the reversible HD reaction is determined by the hydrogen pressure. If the $H_2$ pressure is above the equilibrium pressure, $P_{eq}$, the hydriding reaction proceeds; if it is below $P_{eq}$ the dehydriding reaction proceeds. The hydrogen is often readily removable from the hydride simply by reducing the pressure while maintaining a constant temperature. To increase operating kinetics, the pressure is usually well above the equilibrium pressure when hydriding and under a near vacuum when dehydriding. Thus, the system can be cycled by adding or removing hydrogen.

The metal may be subjected to a number of hydriding—dehydriding cycles if desired. During this treatment, the metal becomes pulverized due to the expansion and contraction of the metal resulting from the absorption and desorption of hydrogen. In the final cycle, hydrogen is removed from the system and the dehydrided metal is recovered. In this state the metal is usually very reactive and can absorb and desorb hydrogen very rapidly. This is an advantage in hydrogen storage applications.

The pulverization of the metal produces a microscale metal that can then be incorporated to form an electrode, preferably an anode. As defined herein, "microscale" metal means a metal that has an average particle size of between about 1 to about 20 microns, assuming spherical particles. The metal is not changed chemically. The microscale metal is then incorporated into an electrode by any known means.

An example of the HD process is the following reaction:

$$LaNi_5 + 3H_2 \Leftrightarrow LaNi_5H_6 \qquad [3]$$

25° C. [$P_{eq}$26 2 atm]

After several hydriding/dehydriding cycles, the average $LaNi_5$ particle size is $\approx 5\mu$ assuming a spherical particle. In practice the hydriding pressure is above 10 atm and the dehydriding pressure <0.1 atm. Under these operating parameters, the $LaNi_5$ powder will react very rapidly at 25° C.

The HDDR Process

More recently, the HDDR (hydriding, dehydriding, disproportionation, and recombination) process has been developed. The HDDR process has been used to produce fine grained, multiphase, $Nd_2Fe_{14}B$ alloys that demonstrated greatly superior magnetic properties over alloys produced by other means. Particle sizes below $0.3\mu$ can be produced depending on the process conditions. In the case of Sm—Fe alloys, particle sizes <100 nm can be prepared by the HDDR process. See Okada et al. *J. of Alloys and Compounds,* 231:60(1995), incorporated herein by reference in its entirety.

As used herein, "disproportionation" is defined as splitting the metal alloy into two or more components at least one of which is a stable metal hydride. Recombination is defined as recombining the two or more metal components to form the original alloy.

An example of the reactions involved in preparing a magnetic rare earth alloy is shown below.

$$Nd_2Fe_{14}B + H_2 \underset{300° C.}{\Leftrightarrow} Nd_2Fe_{14}BH_2 \qquad \text{Hydriding-Dehydriding (HD)} \qquad [4]$$

$$Nd_2Fe_{14}B + 4H_2 \underset{750° C.}{\Leftrightarrow} 2NdH_2 + Fe_2B + 12Fe \qquad \text{Disproportionation- Recombination (DR)} \qquad [5]$$

The HD process (reaction [4]) is reversible and is carried out to pulverize the coarse lumps of $Nd_2Fe_{14}B$ alloy which results in a particle size suitable for the DR process (reaction [5]). The disproportionation reaction is reversible and the system can be cycled at 750° C. as desired. The final step is cooling the recombined alloy $Nd_2Fe_{14}B$ to room temperature. The product has a particle size of ≈0.3µ. See Takeshita, *J. of Alloys and Compounds* 231, 51 (1995), the contents of which are incorporated herein by reference.

Although the HDDR process has previously been exclusively applied to prepare magnetic alloys, it has been discovered that the HDDR process or variants thereof, can be applied to the preparation of electrodes.

Table 1 lists a number of stable binary hydrides and their enthalpies and entropies of formation.

TABLE 1

| Hydride | $\Delta H_f$(kcal) | $\Delta S_f$(cal deg mol)$^{-1}$ |
| --- | --- | --- |
| LiH | −21.5 | −16.4 |
| NaH | −27.0 | −16.3 |
| $CaH_2$ | −41.7 | −30.4 |
| $TiH_2$ | −29.9 | −30.0 |
| $ZrH_2$ | −39 | |
| $NdH_2$ | −50.5 | −34.8 |
| $LaH_2$ | −49.6 | −36.1 |

LiH is very stable ($\Delta H_f$=−21.5 kcal). The rare earth hydrides are also very stable, a fact that has been exploited to produce magnetic rare earth alloys. Most intermetallic compounds that form reversible hydride phases have at least one component which forms a stable binary hydride phase, e.g., TiFe, $LaNi_5$, $CaNi_5$, and $Ti_2Cu$. The term "alloy" as used herein includes intermetallic compounds and metal solid solutions.

The first step (HD) of the conventional HDDR process is hydriding a metal alloy having at least one component capable of forming a stable metal hydride, as discussed above. The resulting reversible metal hydride is then dehydrided, as discussed above. Several HD cycles may be carried out in order to pulverize the metal alloy to produce a desired microscale metal alloy, i.e. a metal alloy having an average particle size of about 1 to about 20 microns.

In the second step (DR process) the microscale metal alloy is heated to an elevated temperature sufficient for the metal atoms to become mobile, usually between about 250 and 800° C. The hydrogen pressure needs to be sufficient at the respective temperature to reversibly disproportionate the microscale metal alloy into a stable metal hydride and metal component(s). This pressure is usually between about 0.5–1000 atm, preferably 1–100 atm. The hydrogen is then removed sufficient to reversibly dehydride the stable metal hydride. When the stable metal hydride is dehydrided, the metal from the dehydrided stable metal hydride subsequently recombines with the metal component(s) to re-form the original metal alloy.

The direction of the reaction is determined by the hydrogen pressure. If the $H_2$ pressure is above the equilibrium pressure, $P_{eq}$, the disproportionation reaction proceeds; if it is below $P_{eq}$ the dehydriding/recombination reaction proceeds. Thus, the system can be cycled by adding or removing hydrogen.

The microscale metal alloy is disproportionated and the resulting stable metal hydride is dehydrided/recombined, alternately, as set forth above, sufficient to physically reduce the microscale metal alloy to a metal alloy powder. "Metal alloy powder" is defined as a powder having a nanoscale particle size. More specifically, the metal alloy powder has an average particle size of less than 600 nm, preferably less than 300 nm, more preferably less than 100 nm. The metal alloy powder is then cooled and recovered and formed into an electrode, preferably an anode, by conventional means.

In a preferred embodiment, a metal oxide component is present when initially hydriding the metal alloy. The metal oxide can be any metal oxide capable of being reduced to the elemental metal by lithium. SnO or $SiO_2$ are preferred. As discussed above, the first step (HD) of the HDDR process yields a microscale metal alloy. The metal alloy is reversibly disproportionated to form a stable metal hydride and metal component.

The stable metal hydride is dehydrided and, subsequently, the metal from the dehydrided stable metal hydride is reacted with the metal component to form a second microscale metal alloy. The metal oxide will be reduced at some point in the HDDR process, likely during the higher temperature DR reactions, either by hydrogen or by the dehydrided metal, (e.g., Li) formed in the DR reaction. Whether the metal oxide is reduced by hydrogen or by the dehydrided metal, the end result is the same; the formation of a stable metal oxide (e.g. $Li_2O$) and a reduced metal, which can further react to form a metal alloy. This is because the dehydrided metal component, e.g. Li, can be oxidized by water as well as the initial metal oxide.

When a metal oxide is present, an excess amount of reductant metal, e.g., lithium, must be initially present. That is, the reductant metal must be present in excess of the amount necessary to reduce the oxide in order that the reductant metal may also react with the reduced metal to form an alloy, e.g., $Li_5Sn_2$. See reactions [12–13]. This second microscale metal alloy can also be disproportionated as shown in reaction [13]. The presence of both a stable metal oxide and metal alloy together form a microscale composite material. However, the alternate disproportionating and dehydriding is applied to the second metal alloy to further reduce its particle size and yield a nanocomposite material.

"Nanocomposite material" is defined herein as a nanoscale product material having at least two distinct phases present in the particle of the product, e.g., several metal alloy phases, a metal alloy and metal oxide phase, or metal alloy phase and metal carbide phase. Having a distinct phase is defined as having a distinctive crystal structure, which can usually be determined by X-ray diffraction.

In a separate embodiment, a solid metal fluoride, preferably $SnF_2$, can be initially present instead of a metal oxide. Here too the metal fluoride must be capable of being reduced, e.g. by metallic Li. The final product will be the formation of a stable fluoride and a metal alloy. The sequence of reactions would be very similar to that noted above with reducible metal oxides. Again, an excess amount of the reductant metal relative to the amount required for the reduction of the metal fluoride is necessary so that the reductant metal can react with the reduced metal to form an alloy. Again the final product will be a nanocomposite material. In this embodiment, the nanocomposite material consists of a metal alloy and a stable metal fluoride.

When initially hydriding the metal alloy, a metal component can be initially present instead of a metal oxide or a metal fluoride. "Metal component" is defined to include elemental metal or metal alloy. The presence of such a metal component can react at high temperatures in the presence of hydrogen and the disproportionated components to form a new alloy. The new alloy then can undergo a series of disproportionation—recombination reactions as desired.

In a separate preferred embodiment, the HD process is bypassed by using starting materials that are already in granular form. "Granular form" is defined as having particles small enough to pass through a 60 mesh U.S. sieve. When using such starting materials, it is the disproportionation—recombination (DR) process that is pertinent. Examples of such materials are the binary hydride LiH, the complex metal alloy hydride LiAlH$_4$ or metal alloys such as Li$_7$Sn$_3$. However, in all cases, a metal component is present that is capable of forming a stable metal hydride.

A metal alloy hydride or metal alloy is disproportionated to form a stable metal hydride and the corresponding metal component in the original alloy. The stable metal hydride is dehydrided and subsequently recombined with the metal component to re-form the alloy as a microscale material. The resulting microscale metal alloy is then subjected to cyclic disproportionation and recombination reactions, as set forth above, sufficient to physically reduce the microscale metal alloy hydride to a metal alloy powder, i.e. a metal alloy having a nanoscale particle size. The metal alloy powder is then formed into an electrode by any known means.

When the starting material is a complex metal alloy hydride, an initial irreversible dehydriding step is necessary in which the complex metal alloy hydride is at least partially irreversibly dehydrided. Such a hydrogen driven process can therefore be referred to as DDR (dehydriding, disproportionation, recombination).

The term "complex metal alloy hydride" refers to alloy hydrides consisting of two or more metal elements combined with hydrogen to form an irreversible hydride phase. Preferably, the complex metal alloy hydride contains a member of the Group 1 or 2 elements combined with Al or B, and H, e.g. LiAlH$_4$. These complex metal alloy hydrides are not reversible hydrides and are synthesized by organometallic techniques; not by the direct reaction of hydrogen with the alloys. Other complex metal hydrides, for example NaAlH$_4$, can behave similarly.

An example of a known hydrogen driven process involving an initial, irreversible dehydriding step and a reversible disproportionation is given below using the complex metal alloy hydride LiAlH$_4$ to produce finely divided LiAl. (See J. Block and Q. P. Gray, *Inorg. Chem.*, 4, 304 (1965) and S. Aronson and F. J. Salzano, *Inorg. Chem.*, 8, #7 Notes 1541, (1969)). The equations involved in the hydrogen driven process using the complex metal alloy hydride LiAlH$_4$ are as follows:

$$\text{LiAlH}_4 \xrightarrow[150^\circ \text{ C.}]{} \text{LiAlH}_2 + \text{H}_2 \uparrow \quad [6]$$

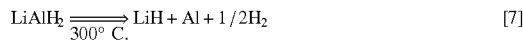

$$\text{LiAlH}_2 \xrightarrow[300^\circ \text{ C.}]{} \text{LiH} + \text{Al} + 1/2\text{H}_2 \quad [7]$$

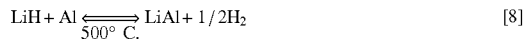

$$\text{LiH} + \text{Al} \xrightleftharpoons[500^\circ \text{ C.}]{} \text{LiAl} + 1/2\text{H}_2 \quad [8]$$

In reaction [6], the commercially available complex hydride is irreversibly dehydrided. Some H$_2$ is removed. In reaction [7] the temperature is increased and the alloy hydride is disproportionated into a stable metal hydride, Al metal and hydrogen. In reaction [8] the LiAl is formed by dehydriding LiH and recombining the Li with Al to form the alloy LiAl; this reaction is reversible. The equilibrium H$_2$ pressure, P$_{eq}$, at 500° C. is ≈0.26 atm. The direction of the reaction is determined by the departure of the H$_2$ pressure above or below P$_{eq}$. Thus, the LiAl may be alternately disproportionated and recombined as desired. Reactions [6] to [8] have been confirmed and produced a metal powder having a surface area of 12.2 m$^2$/g. This is equivalent to an average particle diameter of 288 nm assuming spherical particles. The LiAl is a metal alloy powder as opposed to a nanocomposite material, since it is single phase.

The thermodynamic data for the reaction [8] can be calculated via the van't Hoff equation, $$\text{Ln } P_{eq} \approx (\Delta H_f/R) - (\Delta S/T) \quad [9]$$

where $\Delta H_f$ is the heat of formation of the hydride phase, R is the gas constant $\Delta S$ is the entropy change, and T is the absolute temperature. The $\Delta H_f$ for LiAl at 500° C. was calculated to be −12.6 kcal/mol, in good agreement with the published value of −13.0 kcal/mol. However, it is not necessary to have a detailed knowledge of the system thermodynamics or phase diagram to carry out hydrogen driven process to produce the nanoscale materials.

When performing the DDR process with complex metal alloy hydrides, it is preferred that a metal oxide be present when irreversibly dehydriding in the first step. As in the full HDDR process, the presence of a metal oxide yields a nanocomposite material product. Examples of such metal oxides are SnO, SnO$_2$, SiO$_2$, a transition metal oxide, MgO, CaO, Al$_2$O$_3$, any metal oxide capable of being reduced by lithium, or a combination thereof.

A metal component, carbon, or a combination thereof can also be present during the initial dehydriding step, instead of a metal oxide. The addition of a metal component and/or carbon in the absence of a metal oxide has the effect of reacting to form a new alloy as explained above. When only metals are present in such reactions, a nanocomposite material may be formed or a metal alloy powder may be formed. When a metal oxide is initially present, the formation of a nanocomposite material is assured, since the final product will consist of nanoscale particles consisting of small metal grains and metal oxide grains. When carbon is present it is also likely that a nanocomposite material will be produced.

A solid metal fluoride, preferably SnF$_2$, can also be initially present instead of a metal oxide when performing the DDR process on a complex metal alloy hydride. As discussed above concerning the HDDR process, a nanocomposite material results.

A series of illustrative unbalanced reactions developed to prepare active electrode materials consisting of nanocomposite particles is provided below. X-ray analysis of the final product of reaction [13] determined the presence of a mixture of Li$_5$Sn$_2$, Li$_7$Sn$_2$, Li$_{13}$Sn$_5$, (Li$_x$Sn in reactions [12] and [13])Al and Li$_2$O.

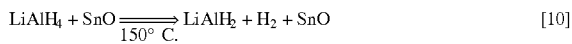

$$\text{LiAlH}_4 + \text{SnO} \xrightarrow[150^\circ \text{ C.}]{} \text{LiAlH}_2 + \text{H}_2 + \text{SnO} \quad [10]$$

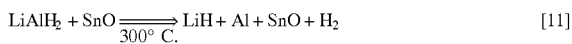

$$\text{LiAlH}_2 + \text{SnO} \xrightarrow[300^\circ \text{ C.}]{} \text{LiH} + \text{Al} + \text{SnO} + \text{H}_2 \quad [11]$$

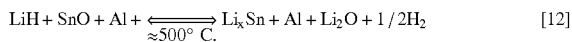

$$\text{LiH} + \text{SnO} + \text{Al} + \xrightleftharpoons[\approx 500^\circ \text{ C.}]{} \text{Li}_x\text{Sn} + \text{Al} + \text{Li}_2\text{O} + 1/2\text{H}_2 \quad [12]$$

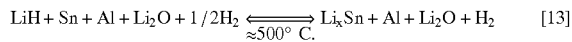

$$\text{LiH} + \text{Sn} + \text{Al} + \text{Li}_2\text{O} + 1/2\text{H}_2 \xrightleftharpoons[\approx 500^\circ \text{ C.}]{} \text{Li}_x\text{Sn} + \text{Al} + \text{Li}_2\text{O} + \text{H}_2 \quad [13]$$

In reaction [10] the complex metal alloy hydride is partially and irreversibly dehydrided. The SnO component remains unreacted as far as is known. In reaction [11] the complex hydride is irreversibly disproportionated. While it is possible that SnO was reduced at this point, it is more likely to happen at the higher temperature at which reaction [12] is carried out. In reaction [13] LiH is dehydrided and SnO is reduced to form a Li/Sn alloy and the stable oxide Li$_2$O. Reactions [10–12] are not reversible. However, reaction [13] is reversible, and Li$_x$Sn is alternately disproportionated and dehydrided/recombined as desired. Li$_2$O is inert. After undergoing several DR cycles, the system is evacuated and cooled. The product mixture, $Li_xSn+Al+Li_2O$, can then be fabricated into an Li electrode.

In the following synthesis, SnO has been replaced with $SiO_2$. The proposed reactions are:

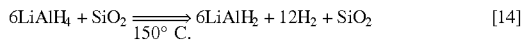 [14]

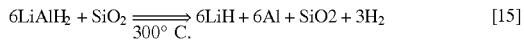 [15]

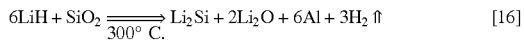 [16]

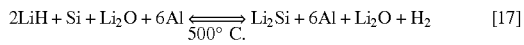 [17]

Reactions [14–16] are not reversible as in the previous case. Reaction [17] is reversible and, again, $Li_2O$ is inert. It is also possible that in reaction [16] ternary alloys of LiAlSi are formed. The conclusion that reactions [13], previously, and [17], above, are reversible is based on the fact that hydrogen is absorbed or desorbed from the reacting solids as determined from the change in hydrogen pressure after hydrogen is removed or added to the system.

In the following reaction sequence, SnO has been replaced with $SnF_2$. Again, the detailed reactions are illustrative and are given in order to provide an insight into the behavior of these materials.

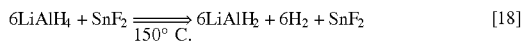 [18]

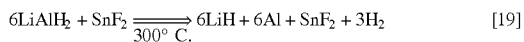 [19]

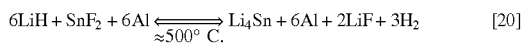 [20]

 [21]

As in the previous illustrations reactions, [18–20] are irreversible whereas [21] is reversible. While $Li_4Sn$ may be produced as shown in [20], it is likely that the final product of this type of reaction sequence will contain several alloy phases.

In a separate embodiment, a metal alloy is subjected to a DR process. A metal alloy is used as the starting material and is reversibly disproportionated to a stable metal hydride and metal component. The stable metal is then dehydrided. When the stable metal is dehydrided, the metal from the dehydrided metal hydride subsequently recombines with the metal component to form a microscale metal alloy. The microscale metal alloy is then disproportionated and the resulting stable metal hydride is dehydrided, alternately, to form a metal alloy powder. The reaction cycle can be repeated as desired. The metal alloy powder is then formed into an electrode by conventional means.

As with the other hydrogen driven processes, a metal component or a metal oxide component can be additionally present when initially disproportionating the metal alloy. In a preferred embodiment, the metal alloy is $Li_xSn$, wherein x ranges between 0.57 and 4.4. Tin oxide is a preferred metal oxide. As described above with regard to the HDDR process on a metal alloy, when a metal oxide is present during the initial disproportionation of the metal alloy, the process yields nanocomposite materials that can be used to form an electrode by known means. Also, as described above, the initial presence of a metal fluoride instead of a metal oxide during disproportionation will also yield a nanocomposite material.

The following reversible reaction demonstrates the disproportionation of a metal alloy starting material.

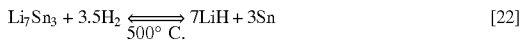 [22]

The product is a fine powder and very reactive chemically. The reactions above do not incorporate a metal oxide to serve as stable substrate. However, a metal oxide can be initially present, as shown in the reactions below:

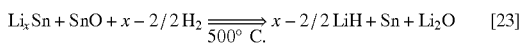 [23]

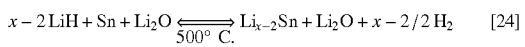 [24]

Reaction [23] is not reversible because $Li_2O$ is inert and cannot be reduced. However, the alloy disproportionation is reversible as indicated in reaction [24]. In this reaction sequence, the product material is physically stabilized by the presence of inert $Li_2O$, which appears on both sides of equation [24]. There are many Li alloys that are similarly thermodynamically susceptible to disproportionation and recombination under the proper conditions of temperature and hydrogen pressure.

A hydrogen driven process can similarly be applied using a stable binary hydride and an additional metal component as the starting materials. In this process, the binary hydride is dehydrided in the presence of the metal component to directly yield a metal alloy powder that can be formed into an electrode. If the metal alloy product has not been physically reduced to a metal alloy powder (i.e. a powder having an average particle size of <1 $\mu$) during the initial dehydriding cycle, the metal alloy can be disproportionated and the resulting metal hydride is dehydrided, alternately, to obtain the desired nanoscale particle size.

A metal oxide component can be additionally present instead of a metal component when initially hydriding the binary hydride. In this process, the binary hydride is dehydrided in the presence of the metal oxide component to directly yield a nancomposite material. If the resulting composite material has not been physically reduced to a nanocomposite material (i.e. a powder having an average particle size of <1 $\mu$) during the initial dehydriding cycle, the metal alloy can be disproportionated and the resulting metal hydride is dehydrided, alternately, to physically reduce the microscale metal alloy to a nanoscale metal alloy, thus forming a nanocomposite material.

A simple reaction showing the use of the binary hydride, LiH, as a starting material is as follows;

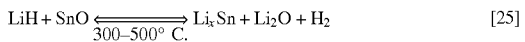 [25]

This reaction may not be fully reversible since complete disproportionation does not appear to be taking place. However, the resulting product mixture is electrochemically active.

A representative series of known reversible hydrogen driven reactions in which Li is not present are listed below. The list is not exhaustive, but is given to illustrate the flexibility of the method.

 [26]

-continued $$CaNi_5 + H_2 \underset{400° C.}{\rightleftharpoons} CaH_2 + 5Ni \qquad [27]$$

$$Ti_2Cu + H_2 \underset{500° C.}{\rightleftharpoons} TiH_2 + TiCu \qquad [28]$$

$$4Ti_2Cu + 3.5H_2 \underset{500° C.}{\rightleftharpoons} 7TiH_2 + TiCu_4 \qquad [29]$$

$$Ti_2Cu + H_2 \underset{500° C.}{\rightleftharpoons} 2TiH_2 + Cu \qquad [30]$$

$$LaNi_5 + H_2 \underset{25°}{\rightleftharpoons} LaNi_5H_6 \qquad [31]$$

$$LaNi_5 + H_2 \underset{500°}{\rightleftharpoons} LaH_2 + 5Ni + H_2 \qquad [32]$$

$$Mg_2Cu + H_2 \underset{250° C.}{\rightleftharpoons} MgH_2 + MgCu_2 \qquad [33]$$

Reaction [26] and [27] together constitute a classic example of a reversible HDDR process. First a powder of the complex hydride is formed via the HD process. Upon further heating, a disproportionation—recombination reaction takes place. In the reversible reactions [28–30] the products depend on the hydrogen pressure. At the highest pressure, the intermetallic compound is completely converted to $TiH_2$ and elemental Cu [30]. Reactions [31] and [32] demonstrate another classic example of the HDDR process using the well known hydrogen storage compound $LaNi_5$.

Finally [33] is an example of a DR reaction sequence which takes place at a relatively low temperature. It does not form a reversible intermetallic hydride but will only undergo a DR reaction sequence. It should be pointed out that none of these latter reactions incorporate Li. However one should not infer that their products would not constitute attractive Li anode materials as Li can be inserted in situ in the first charge of the electrode in an electro-chemical cell to form an electrochemically reversible Li alloy.

All of the reversible reactions in the hydrogen driven processes described above can be readily controlled relative to composition by measuring hydrogen uptake and desorption by monitoring the $H_2$ pressure, at a given temperature. This provides a great advantage relative to the conventional ball-mill processes for reducing the particle sizes of metal alloys. Further, phases can be produced which are not possible to prepare electrochemically or by any other technique. In systems where more than one hydride phase may occur, one can use a hydrogen titration technique to determine system thermodynamics, phase abundance, or to prepare one particular phase among several possibilities, if desired.

In any of the hydrogen driven processes described above which produce a metal alloy powder, partial oxidation of the nanoscale metal alloy powder to produce a nanocomposite metal alloy powder can be accomplished by reacting it with oxygen. Process conditions for partial oxidation typically include a temperature from about 500° C. to about 650° C. The temperature should remain below the melting point of the metal alloy powder. Illustrative reactions using nanoscale $Li_2Al$ produced by prior processing are given below:

$$Li_2Al + \frac{1}{2}O_2 \underset{500° C.}{\rightleftharpoons} \frac{1}{2}Li_2O + LiAl \qquad [34]$$

and $$Li_2Al + X/2 \, O_2 \underset{500° C.}{\rightleftharpoons} Li_2AlO_x \qquad [35]$$

In any hydrogen driven process, a stainless steel reaction chamber is suitable for containing the reactants in contact with pressurized hydrogen. A glass or quartz reactor can be used when the pressure in the reactions are less than 1 atm. Stainless steel is impervious and unreactive to pressurized hydrogen under the conditions employed herein, which can range between 25° and 800° C. at pressures up to 100 atm.

Commercial grade hydrogen is usually of sufficient purity for use in the methods of the invention. One potential source of hydrogen can be the use of a storage reservoir containing a reversible, solid hydrogen storage compound, for example, iron titanium hydride. The hydrogen can be generated by dehydriding the alloy hydride. The hydrogen can also be reabsorbed and recovered for further use by reversing the cycle. Each such cycle of hydrogen evolution and absorption tends to purify the hydrogen, thus minimizing any build up of impurities therein. Cyclic heating and cooling of such a metal hydride hydrogen storage reservoir to generate and reabsorb the hydrogen can be harnessed to "pump" the hydrogen to and from the metal alloy reaction chamber in a suitably designed apparatus, thus eliminating or reducing the need for mechanical pumping. The possibility of recycling the hydrogen, by whatever method, is economically attractive for commercial practice of the method of the invention. The hydrogen storage reservoir has the additional advantage of facilitating the use of high gas pressures without the progressive decline in pressure, which occurs as an ordinary gas cylinder becomes depleted.

Thus, hydrogen driven reactions can be utilized in the method of the invention for obtaining microscale and nanoscale metal alloys. If desired, the nanoscale metal alloy grains can be embedded in an inert matrix. Once the microscale or nanoscale materials are formed, they can be incorporated into an electrode, preferably an anode, by any known means.

To prepare the anode, a substrate is provided which is preferably a highly porous, chemically inert, electrically conductive material. It is also desirable to have a material present with pores sufficiently large to allow easy penetration of the particles in paste form. It is also desirable that the substrate of the anode be somewhat compliant to partially absorb volumetric changes during charging and discharging of the electrochemical cell. In a preferred approach, the anode substrate is comprised of nickel felt, Cu foil and carbon powder.

In a preferred method of supporting the active nanoscale or microscale product on the substrate, the product is mixed with carbon black to form a conductive mixture, which is pressed onto a Cu foil and inserted into a nickel felt pocket after which the assembly is pressed together.

In the hot melt technique, the finely divided product is mixed with a small amount of polymeric material such a polytetrafluoroethylene, also sometimes termed TEFLON™. The mixture is heated to a temperature at which the polymeric material softens while the mixture is pressed into the anode substrate forming the electrode.

In the polymeric solution technique, a polymer is dissolved in an organic solvent. The active product is mixed into the solution, forming a slurry, which is coated onto the substrate. The polymer forms a three dimensional network that anchors the active material to the substrate.

Any of the approaches described above for adhering the active product to the anode substrate may include the incorporation of electrically conductive particles such as metals (e.g., copper) or non-metals (e.g., carbon or graphite) before the product is applied to the substrate. These conductive materials decrease the resistance of the alloy on the anode substrate.

In a separate embodiment, once the electrode has been formed from the nanoscale metal product, lithium can be electrochemically introduced into the electrode during the first charge cycle to form an electrochemically reversible Li alloy within said electrode. This has been demonstrated with SnO containing electrodes as described above. The process is also similar to that taking place with C/Li intercalation electrodes. See P. G. Bruce, *Royal Society, Chemical Communications*, 1897 (1997). However, it is required that the metal grain into which the Li atom is inserted be of nanoscale proportions (<100 nm diameter). Once the Li alloy is formed electrochemically, Li can be reversibly discharged as occurs in LiC intercalation battery anodes.

The electrode formed by the process of the invention can be incorporated as part of a basic electrochemical storage cell. The basic components of an electrochemical storage cell include positive electrode (cathode), negative electrode (anode), an ion-conducting electrolyte, and a separator which prevents direct contact between negative and positive electrodes.

The cathode of the storage cell can be prepared with any operable structure and in any operable manner. The separator material is an electronically nonconductive, porous media which isolates cathodes from anodes electrically to avoid shorts, yet retains a sufficient amount of electrolyte to permit ion transport. The separator should be sufficiently stable chemically in the battery electrolyte to last throughout the service lifetime without producing detrimental effects by any corrosion products. It should retain a sufficiently large amount of electrolyte to provide good ionic conductivity through the separator. The anode, cathode, and separator are assembled together with the separator between the anode and the cathode, to form the basic unit of the electrochemical cell. The cell is placed into a container and an electrolyte is added. The cells according to the invention can be assembled in a conventional manner to form batteries which include, for example, several cells arranged in a series. Such a configuration can be used to increase the voltage, capacity, and current flow.

The following examples are provided to assist in a further understanding of the invention. The particular materials and conditions employed are intended to be further illustrative of the invention and are not limiting upon the reasonable scope thereof.

EXAMPLE 1

A nanocomposite material was prepared using 0.4024 g of granular $LiAlH_4$ and 0.2373 g of granular tin oxide, SnO. The metal hydride was in excess so that upon its decomposition excess Li resulting from hydride decomposition can react with the reduced metal, Sn, to form an alloy. The possible reactions [10–13] are listed above.

The reactants were introduced into a quartz reactor fitted with a glass wool filter to prevent loss of granular material. The reactor was then sealed and evacuated. The reactor was heated slowly under vacuum until hydrogen began to evolve at ≈100° C. at which point the vacuum valve was closed and the $H_2$ pressure permitted to increase. At 164° C. the pressure rapidly increased from 128 to 674 mm Hg. The pressure was reduced to 174 mm and the reactor heated to 319° C., at which point the reactor was evacuated. At this point the irreversible dehydriding of $LiAlH_4$ and its disproportionation into LiH and Al was complete. See reactions [10] and [11]. After evacuation, the vacuum valve was closed and the reactor heated to 526° C., and the hydrogen pressure increased to 82 mm. The reactor was evacuated until off gassing stopped. Here, the reduction of SnO and formation of $Li_xSn$ occurs. See reaction [12]. Hydrogen was added until the reactor pressure was 588 mm. Some $H_2$ was absorbed. At this point, the reversible disproportionation of $Li_xSn$ takes place. See reaction [13]. The reactor was evacuated and the recombination of $Li_xSn$ takes place. See reaction [13]. Hydrogen was added until the pressure was about 600 mm to disproportionate $Li_xSn$ again. The reactor was then again evacuated at 518° C. to effect the recombination of $Li_xSn$. The reactor was evacuated and again hydrogen added until the pressure was 586 mm. Some hydrogen was absorbed. After repeated cycling of reaction [13], the nanocomposite metal powder was deemed suitable and the reactor was then evacuated until off gassing stopped. The reactor was then cooled to room temperature. The sample was removed and stored in a drybox.

The product contained $Li_5Sn_2$, $Li_7Sn_2$, $Li13Sn_5$, Al and $Li_2O$ as determined by X-ray analysis. The surface area of the nanocomposite product was 10.4 $m^2$/g, which is equivalent to an average particle diameter of 188 nm assuming spherical particles. Transmission electron microscopy (TEM) studies determined that grains of the composite material were approximately spherical and approximately 20 nm in diameter.

In order to determine electrochemical characteristics, an electrode was prepared from the product mix in the drybox. 14.53 mg of the composite material plus 10 mg of a carbon binder were mixed in mortar and pestle. The mixture was deposited on disc of copper foil about 1 cm in diameter and then sandwiched between two Ni felt discs. This entire assembly was then pressed together in a small vise which physically immobilized the active material. The composite electrode was then placed upon an insulated aluminum plate fitted with an electrode contact. The following materials were then placed upon the composite electrode in the following sequence: a filter paper disc, a plastic separator disc, another filter paper disc, and finally a Li counter electrode. The electrolyte, consisting of mixture of ethylene carbonate and dimethyl carbonate containing $LiPF_6$ at a concentration of 1 molar, was added to the assembly until the filter paper discs were saturated. Then another matching Al plate with an incorporated contact for the Li metal counter electrode was placed on top of the entire assembly. The cell was sealed by a rubber gasket compressed by bolts between the two insulated Al plates. The cell was removed from the drybox and tested in an Arbin battery cycler.

The electrochemical profile of the $Li_xSn+Al+LiO_2$ material are illustrated in FIG. 1. The voltage profile is plotted for a complete charge—discharge cycle. The electrochemical capacity of the active composite material in the second discharge cycle was 290 mAh/g after correcting for the capacity of the carbon binder, which was determined in a blank experiment. All of the electrochemical cells described in these examples were run at room temperature.

EXAMPLE 2

In this example 0.7937 g of granular $LiAlH_4$ was reacted with 0.2094 g of granular $SiO_2$. The proposed reactions [14–17] are listed above. In this case a stainless reactor was used in order to accommodate hydrogen pressures above 1 atm.

With the exception of the maximum hydrogen pressure, the procedure was similar to that in Example 1. The reactor was evacuated and heated to 330° C., at which point the hydrogen pressure was 187 psia. Hydrogen was removed and the reactor was then heated to 525° C., at which point the $H_2$ pressure was 105 psia. The reactor was evacuated, after which hydrogen was added until the pressure was 203 psia. This hydriding—evacuation cycle was repeated 2 times after which the reactor was cooled and the sample removed to a drybox. The surface area of the product material was 16.2 $m^2/g$, which is equivalent to an average spherical particle size of 144 nm. Again, TEM studies determined that grains of the composite material were approximately spherical and approximately 20 nm in diameter.

Figure 2:
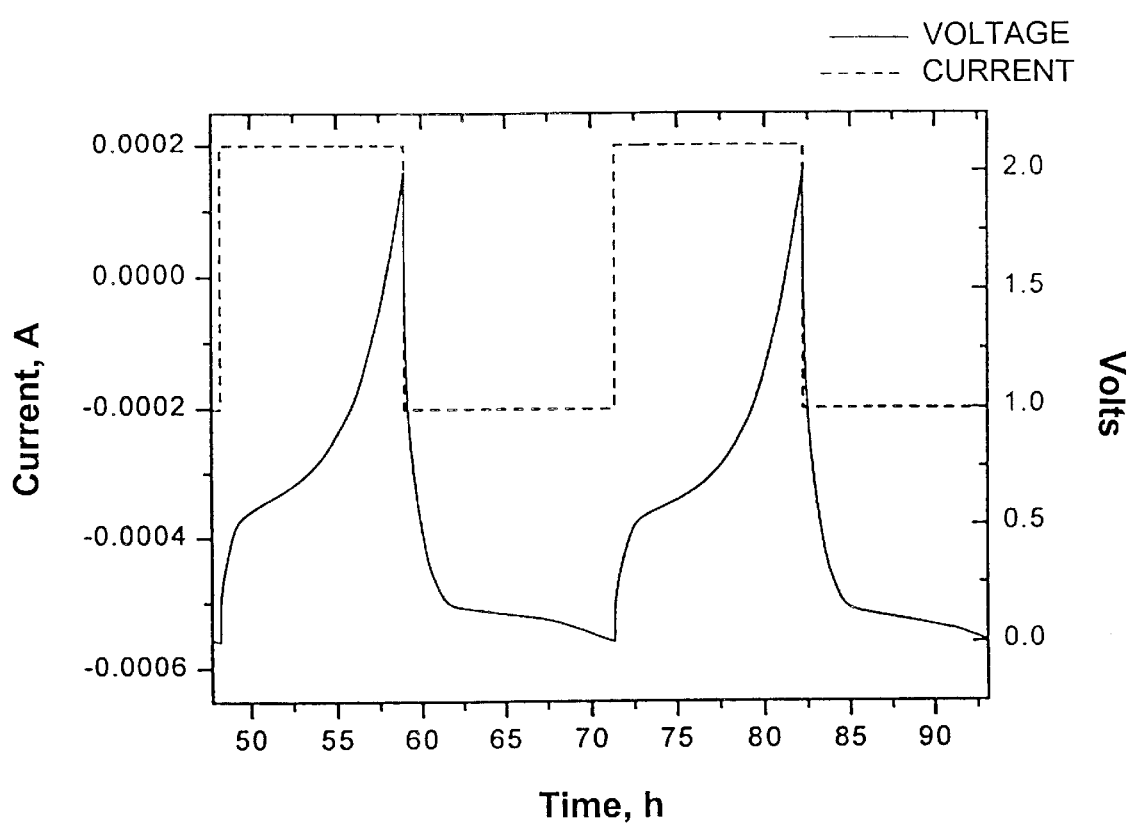
FIG. 2 is graph illustrating the voltage and current of an electrode produced by a method of the invention starting with $LiAlH_4$ and $SiO_2$ during two charge-discharge cycles.

A 7.81 mg sample of the product from reaction [12] was mixed with 4.04 mg of carbon and an electrode prepared and inserted into a cell as described in Example 1. The cell was tested as described above and the results are summarized in FIG. 2. The voltage profile is plotted for two complete charge—discharge cycles. The electrochemical capacity of the active material in the second and third discharge cycles was 231 mAh/g, corrected for carbon content.

While there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

We claim:

1. A method for producing an electrode comprising
subjecting a metal to a hydrogen driven process sufficient to reduce the particle size of the metal to a microscale or nanoscale material, and
forming said microscale or nanoscale material into an electrode.

2. A method as described in claim 1 wherein said hydrogen driven process is selected from the group consisting of HD process, HDDR process, DDR process, or DR process.

3. A method as described in claim 2 wherein said hydrogen driven process is an HD process comprising:
    (a) hydriding a metal capable of forming a reversible metal hydride sufficient to at least partially convert the metal to a metal hydride;
    (b) dehydriding said metal hydride sufficient to re-form said metal; and
    (c) alternately hydriding said metal and dehydriding the resulting metal hydride sufficient to physically reduce said metal to a microscale metal.

4. A method as described in claim 2 wherein said hydrogen driven process is an HDDR process comprising:
    (a) hydriding a metal alloy having at least one component capable of forming a stable metal hydride to form a reversible metal alloy hydride;
    (b) dehydriding said reversible metal alloy hydride;
    (c) alternately hydriding the metal alloy and dehydriding the resulting metal alloy hydride sufficient to form a microscale metal alloy;
    (d) reversibly disproportionating the microscale metal alloy at an elevated temperature to form a stable metal hydride and metal component;
    (e) dehydriding said stable metal hydride and subsequently recombining the metal from said dehydrided stable metal hydride with said metal component to re-form the microscale metal alloy; and
    (f) alternately disproportionating the microscale metal alloy and dehydriding the resulting stable metal hydride as set forth in step (e) sufficient to physically reduce said microscale metal alloy to a metal alloy powder.

5. A method as described in claim 4 further comprising electrochemically introducing Li into the electrode after said electrode is formed so as to yield an electrochemically reversible Li alloy within said electrode.

6. A method as described in claim 4 wherein a metal component is additionally present when hydriding said metal alloy in step (a).

7. A method as described in claim 4 further comprising partially oxidizing said metal alloy powder to form a nanocomposite material.

8. A method as described in claim 2 wherein said hydrogen driven process is an HDDR process comprising:
    (a) hydriding, in the presence of a metal oxide component, a metal alloy having at least one component capable of forming a stable metal hydride to form a reversible metal alloy hydride;
    (b) dehydriding said reversible metal alloy hydride;
    (c) alternately hydriding the metal alloy and dehydriding the resulting metal alloy hydride sufficient to form a microscale metal alloy;
    (d) reversibly disproportionating the microscale metal alloy at an elevated temperature to form a stable metal hydride and metal component;
    (e) dehydriding said stable metal hydride and subsequently reacting the metal from said dehydrided stable metal hydride with said metal component to form a second microscale metal alloy; and
    (f) alternately disproportionating said second microscale metal alloy and dehydriding the resulting stable metal hydride as set forth in step (e) sufficient to physically reduce said second microscale metal alloy to a nanoscale metal alloy to yield a nanocomposite material.

9. A method as described in claim 8 wherein said metal oxide component is selected from the group consisting of SnO or $SiO_2$.

10. A method as described in claim 8 further comprising electrochemically introducing Li into said electrode after the electrode is formed so as to yield an electrochemically reversible Li alloy within said electrode.

11. A method as described in claim 2 wherein said hydrogen driven process is an HDDR process comprising:
    (a) hydriding, in the presence of a metal fluoride component, a metal alloy having at least one component capable of forming a stable metal hydride to form a reversible metal alloy hydride;
    (b) dehydriding said reversible metal alloy hydride;
    (c) alternately hydriding the metal alloy and dehydriding the resulting metal alloy hydride sufficient to form a microscale metal alloy;
    (d) reversibly disproportionating the microscale metal alloy at an elevated temperature to form a stable metal hydride and metal component;
    (e) dehydriding said stable metal hydride and subsequently reacting the metal from said dehydrided stable metal hydride with said metal component to form a second microscale metal alloy; and
    (f) alternately disproportionating said second microscale metal alloy and dehydriding the resulting stable metal hydride as set forth in step (e) sufficient to physically reduce said second microscale metal alloy to a nanoscale metal alloy to yield a nanocomposite material.

12. A method as described in claim 11 wherein said metal fluoride is $SnF_2$.

13. A method as described in claim 2 wherein said hydrogen driven process is a DDR process comprising:
   (a) irreversibly dehydriding a complex metal alloy hydride having at least one component capable of forming a stable metal hydride to form a partially dehydrided complex metal alloy hydride;
   (b) irreversibly disproportionating said partially dehydrided complex metal alloy hydride into a stable metal hydride and a metal component;
   (c) reversibly dehydriding said stable metal hydride and subsequently recombining the metal from said dehydrided stable metal hydride with said metal component to form a microscale metal alloy; and
   (d) alternately disproportionating the microscale metal alloy and reversibly dehydriding the resulting stable metal hydride as set forth in step (c) sufficient to physically reduce said microscale metal alloy to a metal alloy powder.

14. A method as described in claim 13 wherein said complex metal alloy hydride comprises a Group 1 or 2 metal, aluminum or boron, and hydrogen.

15. A method as described in claim 14 wherein said complex metal alloy hydride is $LiAlH_4$.

16. A method as described in claim 13 wherein a metal component, carbon, or combination thereof is additionally present when irreversibly dehydriding said complex metal alloy hydride in step (a).

17. A method as described in claim 13 wherein said complex metal alloy hydride and said metal component, carbon, or combination thereof are in granular form when irreversibly dehydriding the complex metal alloy in step (a).

18. A method as described in claim 13 further comprising electrochemically introducing Li into said electrode after the electrode is formed so as to yield an electrochemically reversible Li alloy within said electrode.

19. A method as described in claim 13 further comprising partially oxidizing said metal alloy powder to form a nanocomposite material.

20. A method as described in claim 2 wherein said hydrogen driven process is a DDR process comprising:
   (a) irreversibly dehydriding a complex metal alloy hydride having at least one component capable of forming a stable metal hydride, in the presence of a metal oxide component, metal component, carbon, or combination thereof, to form a partially dehydrided complex metal alloy hydride;
   (b) irreversibly disproportionating said partially dehydrided complex metal alloy hydride to form a stable metal hydride and metal component;
   (c) reversibly dehydriding said stable metal hydride and subsequently reacting the metal from said dehydrided stable metal hydride with said metal component to form a microscale metal alloy; and
   (d) alternately disproportionating the microscale metal alloy and reversibly dehydriding the resulting stable metal hydride as set forth in step (c) sufficient to physically reduce said microscale metal alloy to a nanoscale metal alloy to yield a nanocomposite material.

21. A method as described in claim 20 wherein said complex metal alloy hydride is $LiAlH_4$.

22. A method as described in claim 20 wherein said metal oxide is selected from the group consisting of SnO, $SnO_2$, $SiO_2$, a transition metal oxide, MgO, CaO, $Al_2O_3$, any metal oxide capable of being reduced by lithium, or a combination thereof.

23. A method as described in claim 22 wherein said metal oxide component is $SiO_2$.

24. A method as described in claim 2 wherein said hydrogen driven process is a DDR process comprising:
   (a) irreversibly dehydriding a complex metal alloy hydride having at least one component capable of forming a stable metal hydride, in the presence of a metal fluoride component, to form a partially dehydrided complex metal alloy hydride;
   (b) irreversibly disproportionating said partially dehydrided complex metal alloy hydride to form a stable metal hydride and metal component;
   (c) reversibly dehydriding said stable metal hydride and subsequently reacting the metal from said dehydrided stable metal hydride with said metal component to form a microscale metal alloy; and
   (d) alternately disproportionating said microscale metal alloy and reversibly dehydriding the resulting stable metal hydride as set forth in step (c) sufficient to physically reduce said microscale metal alloy to a nanoscale metal alloy to yield a nanocomposite material.

25. A method as described in claim 24 wherein said complex metal alloy hydride is $LiAlH_4$.

26. A method as described in claim 24 wherein said metal fluoride component is $SnF_2$.

27. A method as described in claim 2 wherein said hydrogen driven process is a DR process comprising:
   (a) reversibly disproportionating a metal alloy to a stable metal hydride and metal component;
   (b) dehydriding said stable metal hydride and subsequently recombining the metal from said dehydrided metal hydride with said metal component to form a microscale metal alloy; and
   (c) alternately disproportionating the microscale metal alloy and dehydriding the resulting stable metal hydride as set forth in step (b) sufficient to physically reduce said microscale metal alloy to a metal alloy powder.

28. A method as described in claim 27 wherein a metal component is additionally present when disproportionating said metal alloy in step (a).

29. A method as described in claim 28 wherein said metal alloy and said metal component are initially in granular form.

30. A method as described in claim 27 wherein said metal alloy is $Li_xSn$, wherein x ranges between 0.57 and 4.4.

31. A method as described in claim 27 further comprising partially oxidizing said metal alloy powder to form a nanocomposite material.

32. A method as described in claim 2 wherein said hydrogen driven process is a DR process comprising:
   (a) reversibly disproportionating a metal alloy in the presence of a metal oxide at elevevated temperature to form a stable metal hydride and metal component;
   (b) reversibly dehydriding said stable metal hydride and subsequently reacting the metal from said dehydrided metal hydride with said metal component to form a microscale metal alloy; and
   (c) alternately disproportionating the microscale metal alloy and dehydriding the resulting stable metal hydride sufficient to physically reduce said microscale metal alloy to a nanoscale metal alloy to yield a nanocomposite material.

33. A method as described in claim 32 wherein said metal oxide is SnO and wherein said metal alloy is $Li_xSn$, wherein x ranges between 0.57 and 4.4.

34. A method as described in claim 2 wherein said hydrogen driven process is a DR process comprising:
(a) reversibly disproportionating a metal alloy in the presence of a metal fluoride at elevevated temperature to form a stable metal hydride and metal component;
(b) reversibly dehydriding said stable metal hydride and subsequently reacting the metal from said dehydrided metal hydride with said metal component to form a microscale metal alloy; and
(c) alternately disproportionating the microscale metal alloy and dehydriding the resulting stable metal hydride sufficient to physically reduce said microscale metal alloy to a nanoscale metal alloy to yield a nanocomposite material.

35. A method as described in claim 1 wherein said hydrogen driven process comprises dehydriding a stable binary metal hydride in the presence of an additional metal component to yield a metal alloy powder.

36. A method as described in claim 35 wherein said binary metal hydride is LiH.

37. A method as described in claim 35 wherein said metal component is aluminum.

38. A method as described in claim 35 further comprising partially oxidizing said metal alloy powder to form a nanocomposite material.

39. A method as described in claim 1 wherein said hydrogen driven process comprises dehydriding a stable binary metal hydride in the presence of a metal oxide component to yield a nanocomposite material.

40. A method as described in claim 39 wherein said binary metal hydride is LiH.

41. A method as described in claim 39 wherein said metal oxide component is SnO.

42. A method as described in claim 1 wherein said hydrogen driven process comprises:
(a) dehydriding a stable binary metal hydride in the presence of an additional metal component to yield a microscale metal alloy; and
(b) alternately disproportionating the microscale metal alloy and dehydriding the resulting metal hydride sufficient to physically reduce the microscale metal alloy to a metal alloy powder.

43. A method as described in claim 42 wherein said binary hydride is LiH.

44. A method as described in claim 42 wherein said metal component is aluminum.

45. A method as described in claim 42 further comprising partially oxidizing said metal alloy powder to form a nanocomposite material.

46. A method as described in claim 1 wherein said hydrogen driven process comprises:
(a) dehydriding a stable binary metal hydride in the presence of a metal oxide component to yield a microscale metal alloy; and
(b) alternately disproportionating the microscale metal alloy and dehydriding the resulting metal hydride sufficient to physically reduce the microscale metal alloy to a nanoscale metal alloy to yield a nanocomposite material.

47. A method as described in claim 46 wherein said binary metal hydride is LiH.

48. A method as described in claim 46 wherein said metal oxide component is SnO.

* * * * *